No. 885,303. PATENTED APR. 21, 1908.
M. SNYDER & A. ZUZAK.
SAFETY CATCH FOR CABLE RAILROADS.
APPLICATION FILED DEC. 4, 1907.
2 SHEETS—SHEET 1.
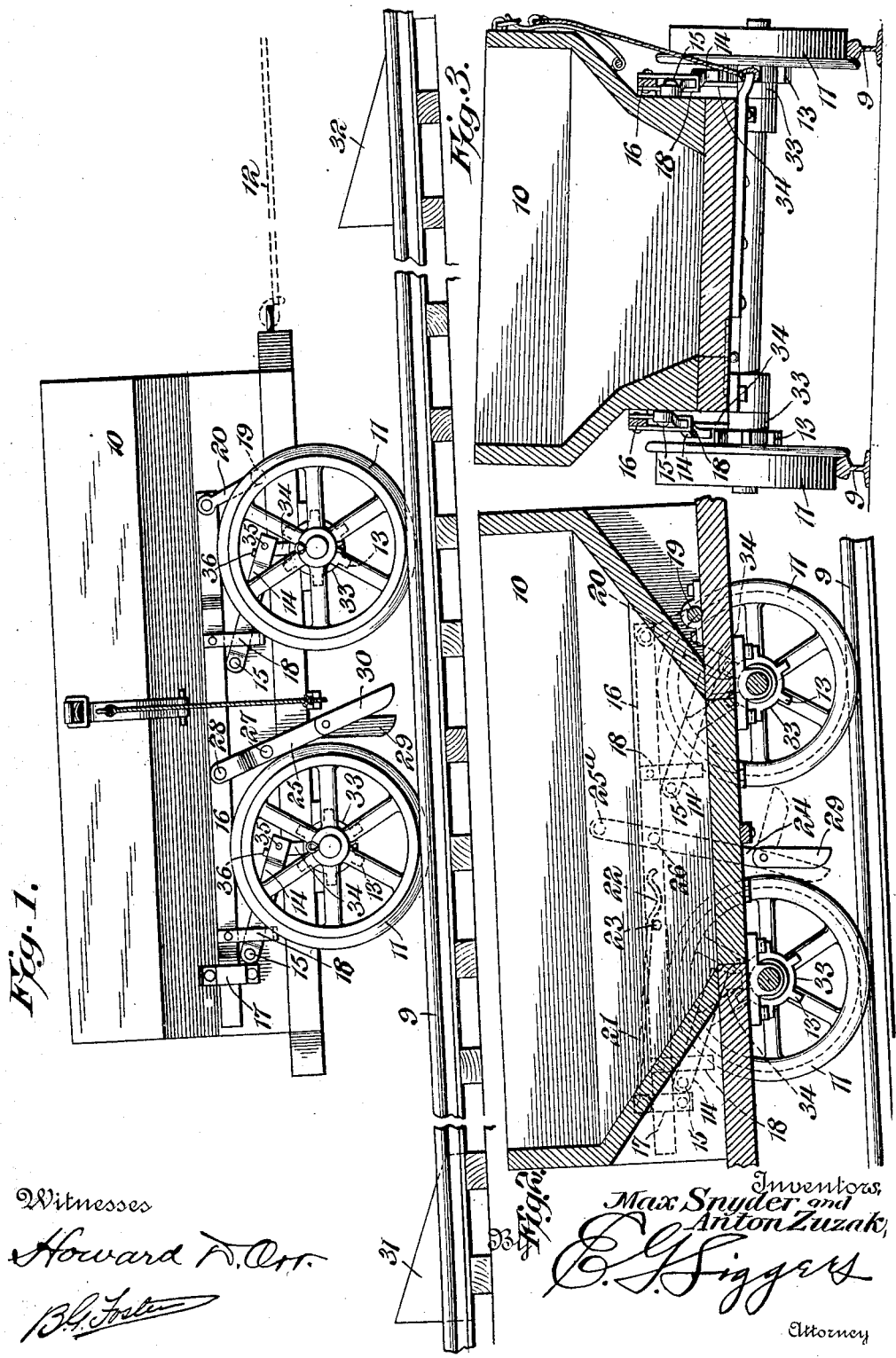
Witnesses
Howard D. Orr.
B. G. Foster
Inventors,
Max Snyder and
Anton Zuzak,
E. G. Siggers
Attorney No. 885,303.
PATENTED APR. 21, 1908.
M. SNYDER & A. ZUZAK.
SAFETY CATCH FOR CABLE RAILROADS.
APPLICATION FILED DEC. 4, 1907.
2 SHEETS—SHEET 2.
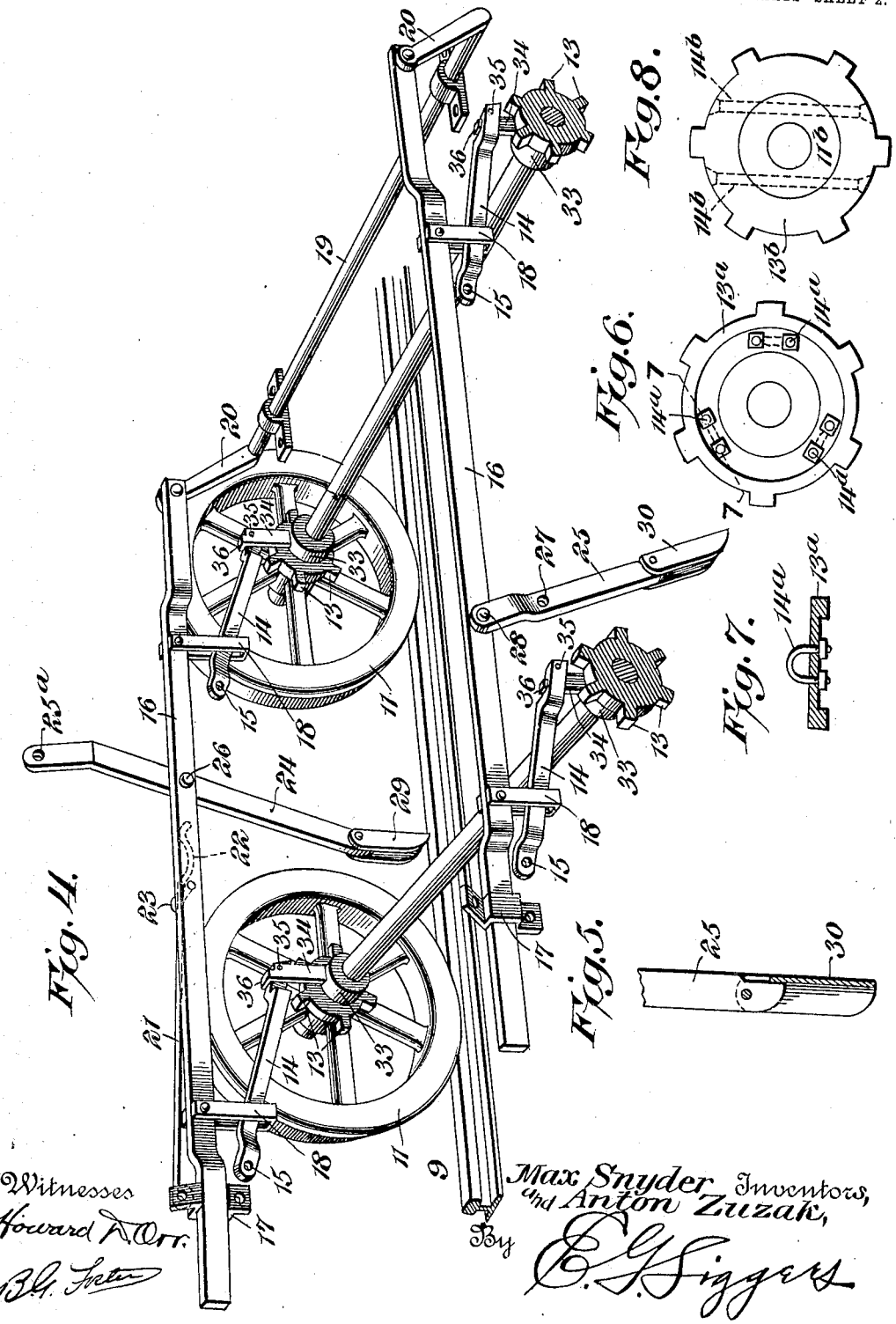
Witnesses
Howard A. Orr.
B. G. Foster
Max Snyder, Inventors,
and Anton Zuzak,
By C. G. Siggers
Attorney

UNITED STATES PATENT OFFICE.

MAX SNYDER, OF BEATTY, AND ANTON ZUZAK, OF BAGGALEY, PENNSYLVANIA.

SAFETY-CATCH FOR CABLE-RAILROADS.

No. 885,303.      Specification of Letters Patent.      Patented April 21, 1908.

Application filed December 4, 1907. Serial No. 405,067.

*To all whom it may concern:*

Be it known that we, MAX SNYDER, a citizen of the United States, residing at Beatty, in the county of Westmoreland and State of Pennsylvania, and ANTON ZUZAK, a citizen of Austria-Hungary, residing at Baggaley, in the county of Westmoreland and State of Pennsylvania, have invented a new and useful Safety-Catch for Cable-Railroads, of which the following is a specification.

In the operation of inclined railroads, as for instance those at mines, it is the ordinary practice to carry the cars up the inclines and control their downward movements by means of cables. Considerable difficulty, however, is often experienced through the breaking of the cables, which by releasing the cars, permits them to gravitate to the lower end of the tracks where they are broken, besides doing great damage to the adjacent property.

The principal object of the present invention is to provide novel, simple and effective mechanism which will permit the proper upward and downward movement of the cars, but which will prevent the downward movement of said cars if the cable breaks while they are being drawn upwardly.

The preferred embodiment of the invention is illustrated in the accompanying drawings, wherein:—

Figure 1 is a side elevation of a car and track equipped with the mechanism. Fig. 2 is a longitudinal sectional view through the car. Fig. 3 is a cross sectional view. Fig. 4 is a perspective view of the running gear and the safety catch means. Fig. 5 is a detail sectional view through one of the dogs. Fig. 6 is a detail view of a slightly modified form of ratchet wheel. Fig. 7 is a sectional view on the line 7—7 of Fig. 6. Fig. 8 is a modification of another form of ratchet wheel.

Similar reference numerals designate corresponding parts in all the figures of the drawings.

In the embodiment illustrated, the track, designated by the reference numeral 9, may be of any well known construction and disposed at any inclination. Upon the same runs a car or vehicle 10 supported on wheels 11 that operate on the track 9. It will be understood that this car is hauled to the top of the track and lowered to the bottom by means of a suitable cable indicated in the dotted lines at 12.

In the present form of construction, each of the wheels 11 is equipped with a circular series of ratchet teeth 13. The ratchet teeth may be formed integrally with the wheel, or as illustrated in Figs. 6 and 7, ratchet wheels $13^a$ can be employed secured to the supporting wheels 11 by clips $14^a$ that embrace the spokes of said wheels, or a ratchet wheel $13^b$ can be fitted on the hub $11^b$ of each wheel, and secured thereto by suitable bolts $14^b$, as shown in Fig. 8. Moreover while teeth provided with opposite squared shoulders are preferably employed in order that the wheels can be placed indiscriminately on the ends of the axles, it will be understood that tapered or beveled teeth can be used if desired.

Coöperating with the teeth of each wheel is a swinging pawl 14 pivotally mounted, as shown at 15 on the car, and thus being movable into and out of engagement with said teeth. Reciprocatory slide bars 16 are slidably mounted in keepers 17 on opposite sides of the car, and have depending yokes 18 fixed to the same and embracing the different pawls. Consequently upon the reciprocation of the slide bars, it will be evident that the pawls will be swung towards and away from the ratchet teeth. In order to effect the simultaneous movement of said slide bars, a rock shaft 19 is journaled transversely upon one end of the car, and has at its ends crank arms 20 connected to the adjacent ends of the slide bars. The slide bars are held in their different positions by a spring arm 21 secured to one side of the car and having a bowed portion 22, beneath which slides a pin 23 carried by one of the slide bars. For the purpose of actuating said slide bars two levers, designated respectively 24 and 25 are mounted on opposite sides of the car. One of these levers, as 24, is fulcrumed at its upper end, as shown at $25^a$, and has a pivotal connection 26 between its ends with one of the slide bars 16. The other lever 25 is fulcrumed between its ends, as shown at 27, and has a pivotal connection at its upper end, as illustrated at 28 with the other slide bar. It will thus be evident that if one lever is swung in one direction, both of the slide bars 16 will be moved in the same direction, while the other lever will be swung in an opposite direction, and the reverse movements of the parts will take place on the opposite movements of said other lever. Pivotally hung from the lower ends of the levers 24 and 25 are dogs 29 and 30. These dogs are capable of free forward swinging movement, but they cannot swing rearwardly beyond alinement with the respective levers. Mounted between the rails at the lower end of the track is a trip block 31, which is disposed in the path of movement of the dog 29, and located between the rails at the upper end of the track, is another trip dog 32 disposed in the path of movement of the dog 30.

It will be observed, particularly by reference to Figs. 3 and 4, that at the inner sides of the ratchet wheels or teeth 13 are smooth circular tracks 33, and fingers 34, pivoted, as shown at 35 to the free ends of the pawls 14, are aranged to ride upon the tracks when the wheels rotate in one direction, but will be swung off of said tracks when the wheels rotate in an opposite direction. This operation is secured by means of offset lips 36 carried by the upper ends of the fingers 34, which lips engage the upper edges of the pawls 14 when the fingers are in upright position, and prevent the movement of said fingers beyond such upright position. Nevertheless the said lips will permit the free rearward swinging movement of the fingers.

The operation of the mechanism is substantially as follows: Assuming the parts in the positions illustrated in the various figures, and the car being drawn upwardly, the yokes 18 will be in their rearmost positions, and the pawls 14 will thus be in coaction with the ratchet teeth. They are normally held out of engagement with said ratchet teeth by the fingers 34, and will be so maintained as long as the wheels rotate to carry the car upwardly, the frictional engagement between the lower ends of said fingers and the tracks 33 holding the fingers in upright positions. There will consequently be no click due to the riding of the pawls over the ratchet teeth. If, however, the rope or cable breaks, the car being free would start down the incline, but upon the reverse rotation of the wheels, the fingers 34 will be swung rearwardly, thus permitting the pawls 14 to drop into engagement with the wheels and all of said wheels will be locked. If, however, no accidents occur, when the car reaches the upper end of the track, the dog 30 of the lever 24 will engage the trip block 32, and as a result, said lever will be swung to a rearward position. This will cause the forward movement of the slide bars 16 and a corresponding movement on the part of the links 18. These links riding beneath the pawls 14 will elevate the same so as to hold them out of coaction with the ratchet wheels. The car can therefore move downwardly, for the wheels can rotate freely in the opposite direction, and as the dog 30 engages the block 32 it can swing upwardly with respect to the lever and ride freely over said block without actuating said lever. When the lower end of the track is reached, the dog 29 will in like manner ride over the trip block 31, but as the car starts up the incline, said dog 29 engaging the lower edge of said trip block and being held against movement beyond the alinement with the lever 24, will consequently cause said lever to swing rearwardly, carrying the various yokes rearwardly and permitting the pawls to again be moved to their active position, or as shown in Fig. 4.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described our invention, what we claim as new, and desire to secure by Letters Patent, is:—

1. The combination with a vehicle, of a wheel therefor, a device carried by the vehicle and movable into coaction with the wheel to prevent its rotation in one direction while permitting its rotation in the opposite direction, said device being movable out of coaction with the wheel to permit its free rotation in opposite directions, and automatic means for moving the holding device.

2. The combination with a vehicle, of a wheel therefor, a device carried by the vehicle and movable into coaction with the wheel to prevent its rotation in one direction while permitting its rotation in the opposite direction, said device being movable out of coaction with the wheel to permit its free rotation in opposite directions, an actuating member for the device, said member being carried by the vehicle, and means located in the path of movement of the member for effecting its movement.

3. The combination with a vehicle, of a wheel therefor, a device carried by the vehicle and movable into coaction with the wheel to prevent its rotation in one direction while permitting its rotation in the opposite direction, said device being movable out of coaction with the wheel to permit its free rotation in opposite directions, a lever for actuating the device, and a trip located in the path of movement of the lever for effecting its movement.

4. The combination with a vehicle, of a wheel therefor, a device carried by the vehicle and movable into coaction with the wheel to prevent its rotation in one direction, while permitting its rotation in the opposite direction, said device being movable out of coaction with the wheel to permit its free rotation in opposite directions, actuating means for the device including an element having a free movement in one direction and a limited movement in an opposite direction, and a trip located in the path of movement of said element.

5. The combination with a vehicle, of a wheel therefor, a device carried by the vehicle and movable into coaction with the wheel to prevent its rotation in one direction while permitting its rotation in the opposite direction, said device being movable out of coaction with the wheel to permit its free rotation in opposite directions, a lever mounted on the vehicle, a dog movably mounted on the lever, and a trip disposed in the path of movement of the dog, said dog moving over the trip in one direction without operating the lever and effecting the operation of the lever when moving in an opposite direction.

6. The combination with a vehicle, of a wheel therefor having ratchet teeth, a pawl movable into and out of engagement with the ratchet teeth to prevent the rotation of the wheel in one direction, while permitting its rotation in an opposite direction, means for swinging the pawl including a lever mounted on the vehicle, a dog pivotally mounted on the lever and having a free swinging movement thereon in one direction, its movement in an opposite direction being limited by said lever, and a trip located in the path of movement of the dog.

7. The combination with a vehicle including a wheel, of a device mounted on the vehicle and movable into coaction with the wheel to permit the rotation of said wheel in one direction and permit its movement in another direction, automatic means for moving the device into coaction with the wheel, and automatic means for moving the device out of coaction with the wheel to permit the rotation of said wheel in said opposite direction.

8. The combination with a vehicle, including a wheel, of a device mounted on the vehicle and movable into and out of coaction with the wheel to permit its rotation in one direction and prevent its rotation in an opposite direction, and automatic mechanism for effecting the movement of the device into and out of coaction with the wheel, said mechanism including actuating devices located at different positions along the path of movement of the vehicle.

9. The combination with a vehicle including a wheel, of a device mounted on the vehicle and movable into and out of coaction with the wheel to permit its rotation in one direction and to prevent its rotation in an opposite direction, one means for moving said device into coaction with the wheel, and including an actuating device located at a predetermined position in the path of movement of the vehicle and another means for moving it out of coaction with the wheel, and including an actuating device located at another predetermined position in the path of movement of the vehicle.

10. The combination with a vehicle including a wheel, of a device mounted on the vehicle and movable into and out of coaction with the wheel to permit its rotation in one direction and to prevent its rotation in an opposite direction, and separate levers for respectively moving said device into and out of coaction with the wheel.

11. The combination with a vehicle including a wheel, of a device mounted on the vehicle and movable into and out of coaction with the wheel to permit its rotation in one direction and to prevent its rotation in an opposite direction, separate levers for respectively moving said device into and out of coaction with the wheel, and a trip located in the path of each lever for effecting its automatic movement.

12. The combination with a vehicle including a wheel, of a device mounted on the vehicle and movable into coaction with the wheel to permit its rotation in one direction and prevent its rotation in an opposite direction, and separate oppositely swinging levers for respectively moving the device into and out of coaction with the wheel.

13. The combination with a vehicle including a wheel, of a pawl movable into and out of coaction with the wheel, controlling means for the pawl, oppositely swinging levers connected to the controlling means for respectively moving said pawl into and out of coaction with the wheel, and trips located in the path of movement of the levers.

14. The combination with a vehicle having a plurality of wheels, of pawls movable into and out of coaction with the wheels, controlling means for the pawls, and separate actuating devices connected to the controlling means for respectively moving the pawls into and out of coaction with the wheels.

15. The combination with a vehicle having wheels, of swinging pawls movable into and out of coaction with the wheels, slide bars mounted on the vehicle and having devices that engage the pawls for effecting their swinging movements, and means for automatically sliding the bars.

16. The combination with a vehicle, including a plurality of supporting wheels, said wheels having ratchet teeth, swinging pawls movable out of coaction with the ratchet teeth, reciprocatory slide bars mounted on opposite sides of the vehicle and having yokes that engage the pawls for effecting their swinging movements, a transversely disposed rock shaft having crank arms engaged with the slide bars, oppositely swinging levers fulcrumed on the vehicle and connected to the slide bars, and trips located in the path of movement of the levers.

17. The combination with a vehicle, of a wheel therefor having teeth, a pawl movable into and out of coaction with the teeth, a reciprocatory bar having a reciprocatory portion slidably engaged with the pawl to cause its movement into and out of coaction with the teeth, and means for reciprocating the bar.

18. The combination with a vehicle, of a wheel therefor having ratchet teeth, a swinging pawl movable into and out of coaction with the teeth, a reciprocatory bar, a hanger yoke fixed to the bar and embracing the pawl, and a lever connected to the bar for operating the same.

19. The combination with a vehicle, of a plurality of wheels therefor, a reciprocatory bar mounted on the vehicle, a plurality of pawls movable into and out of coaction with the wheel, devices carried by the bar and engaging the pawls for effecting their movements, and means for reciprocating the bar.

20. The combination with a vehicle having wheels on its opposite sides, of ratchet teeth carried by the wheels, reciprocatory bars slidably mounted on opposite sides of the vehicle, a connection between the bars for effecting their simultaneous movements, pawls movable into and out of coaction with the ratchet teeth and operated by the bars, a spring device engaging one of the bars for holding said bars in different positions, and means for actuating the bars.

21. The combination with a vehicle having a wheel, of a device movable into coaction with the wheel and permitting its movement in one direction while preventing its movement in a reverse direction, and means for holding the device out of coaction therewith during its movement in one direction, said means permitting the device to automatically move into coaction with the wheel on its said reverse movement.

22. The combination with a vehicle having ratchet teeth, of a pawl movable into engagement with the ratchet teeth to permit the movement of the wheel in one direction and prevent its movement in a reverse direction, and means for holding the pawl out of engagement with the ratchet wheel during the movement of the wheel in one direction, said means permitting the pawl to automatically move into engagement with the teeth on the reverse rotation of said wheel.

23. The combination with a vehicle having ratchet teeth, of a pawl movable into engagement with the ratchet teeth to permit the movement of the wheel in one direction and prevent its movement in a reverse direction, and a supporting device movably mounted on the pawl and holding said pawl out of engagement with the ratchet teeth during the rotation of the wheel in one direction, said supporting device permitting the pawl to drop into engagement with the teeth on the said reverse rotation of the wheel.

24. The combination with a vehicle, of a wheel for said vehicle having an annular series of ratchet teeth, and a smooth circular portion, a pawl capable of swinging movement into and out of engagement with the teeth, a supporting finger pivoted to the pawl and having a limited swinging movement thereon in one direction, said finger riding on the smooth portion of the wheel during the rotation of said wheel in one direction and holding the pawl out of engagement with the ratchet teeth and moving off of said smooth portion on the reverse rotation of the wheel to permit the pawl to move into engagement with the teeth.

25. The combination with a vehicle, of a wheel therefor, a device movable into and out of engagement with the wheel, a slide bar for moving the device into and out of engagement with the wheel, means for moving the slide bar, and a spring that coacts with the slide bar to hold the same in different positions.

26. The combination with a vehicle, of a plurality of supporting wheels therefor, said wheels having ratchet teeth, swinging pawls movable into and out of coaction with the teeth, devices mounted on the pawls for supporting the same out of coaction with the teeth during the rotating of the wheels in one direction and permitting said pawls to move into engagement with the teeth on the rotation of the wheels in an opposite direction, slide bars mounted on opposite sides of the vehicle and having yokes that engage the pawls for swinging the same, a rock shaft mounted on the vehicle and having crank arms connected to the slide bars, oppositely swinging levers fulcrumed on opposite sides of the vehicle and connected to the slide bars, dogs pivoted on the lower ends of the levers, said dogs having a limited movement in one direction, and trips located in the paths of movements of the dogs to effect the movements of the levers.

In testimony, that we claim the foregoing as our own, we have hereto affixed our signatures in the presence of two witnesses.

MAX SNYDER.
ANTON ZUZAK.

Witnesses:
FRANK ZYGAWURCZ,
LYMAN MACHRIK.